(12) United States Patent
Kerecelidze (10) Patent No.: US 10,589,372 B2
(45) Date of Patent: Mar. 17, 2020

(54) METHOD OF AND APPARATUS FOR CONTROLLING A WELD PENETRATION PROFILE WITH APPLICATION OF SHIELDING GAS IN AN INNER REGION OF A WORKPIECE

(71) Applicant: Micro Motion, Inc., Boulder, CO (US)

(72) Inventor: Giorgi Kerecelidze, Lakewood, CO (US)

(73) Assignee: Micro Motion, Inc., Boulder, CO (US)

( * ) Notice: Subject to any disclaimer, the term of this patent is extended or adjusted under 35 U.S.C. 154(b) by 526 days.

(21) Appl. No.: 15/325,166

(22) PCT Filed: Aug. 7, 2014

(86) PCT No.: PCT/US2014/050167
§ 371 (c)(1),
(2) Date: Jan. 10, 2017

(87) PCT Pub. No.: WO2016/022130
PCT Pub. Date: Feb. 11, 2016

(65) Prior Publication Data
US 2017/0157695 A1  Jun. 8, 2017

(51) Int. Cl.
*B23K 9/16* (2006.01)
*B23K 9/028* (2006.01)
(Continued)

(52) U.S. Cl.
CPC ............... *B23K 9/16* (2013.01); *B23K 9/028* (2013.01); *B23K 9/035* (2013.01); *B23K 35/24* (2013.01); *B23K 35/28* (2013.01); *B23K 35/30* (2013.01); *B23K 35/32* (2013.01); *B23K 35/38* (2013.01); *B23K 35/383* (2013.01); *B23K 37/06* (2013.01); *G01F 1/8404* (2013.01); *B23K 2101/06* (2018.08)

(58) Field of Classification Search
CPC .......... B23K 9/16; B23K 9/028; B23K 9/035; B23K 37/06; B23K 35/38
USPC .......... 219/61, 61.1, 73, 125.1, 130.5, 137 R
See application file for complete search history.

(56) References Cited

U.S. PATENT DOCUMENTS

| 3,614,378 A | 10/1971 | Goodell et al. |
| 5,206,475 A * | 4/1993 | Wada ................. B23K 35/3612 |
| | | 219/145.23 |

(Continued)

FOREIGN PATENT DOCUMENTS

| CN | 103182590 A | 7/2013 |
| EP | 2202493 A1 * | 12/2008 |

(Continued)

*Primary Examiner* — Thien S Tran
(74) *Attorney, Agent, or Firm* — The Ollila Law Group LLC (57) ABSTRACT

A method of controlling a weld penetration profile on a workpiece (306) having an outer region and an inner region is described. The method comprises the step of applying energy to the outer region of the workpiece with a welder (302) to produce a weld pool (304). The method also comprises the steps of penetrating the workpiece (306) such that the weld pool (304) spans between the outer region and inner region, and also applying a shielding gas to the inner region at a pressure that provides a force that limits weld penetration. A corresponding apparatus is also defined.

27 Claims, 10 Drawing Sheets

(51) Int. Cl.
*B23K 9/035* (2006.01)
*B23K 37/06* (2006.01)
*B23K 35/32* (2006.01)
*B23K 35/30* (2006.01)
*B23K 35/28* (2006.01)
*B23K 35/24* (2006.01)
*B23K 35/38* (2006.01)
*G01F 1/84* (2006.01)
*B23K 101/06* (2006.01)

(56) References Cited

U.S. PATENT DOCUMENTS

| | | | | |
|---|---|---|---|---|
| 5,425,492 A | * | 6/1995 | Thode | B23K 9/164 |
| | | | | 219/74 |
| 5,484,973 A | * | 1/1996 | Gittens | B23K 9/162 |
| | | | | 219/61 |
| 5,864,111 A | * | 1/1999 | Barefoot | B23K 9/0286 |
| | | | | 219/61 |
| 2002/0174730 A1 | | 11/2002 | Drahm et al. | |
| 2004/0200881 A1 | * | 10/2004 | Gandy | B23K 9/0253 |
| | | | | 228/103 |

FOREIGN PATENT DOCUMENTS

| | | | |
|---|---|---|---|
| EP | 1389300 B1 | | 8/2015 |
| JP | 07214309 A | * | 8/1995 |
| JP | H10263812 A | | 10/1998 |
| JP | 2004148374 A | | 5/2004 |
| JP | 2004538449 A | | 12/2004 |
| JP | 2005034895 A | | 2/2005 |

* cited by examiner

METHOD OF AND APPARATUS FOR CONTROLLING A WELD PENETRATION PROFILE WITH APPLICATION OF SHIELDING GAS IN AN INNER REGION OF A WORKPIECE

FIELD OF THE INVENTION

The embodiments described below relate to the field of welding, and more particularly, to a method and related apparatus for improving internal weld profiles.

BACKGROUND

Welding is a fabrication process well known in the art, wherein metals are joined together through coalescence—typically by melting workpieces together, and sometimes adding a filler material to form a weld pool of molten metal. The molten weld pool eventually cools to form a continuous joint.

Many different means of welding exist, such as Gas Metal Arc Welding (GMAW or MIG), Shielded Metal Arc Welding (SMAW), and Gas Tungsten Arc Welding (GTAW, or TIG), for example. Various energy sources are used, such as electrical arcs, lasers, gas flames, etc. to melt the workpiece and form the weld pool. In most welding means, a metal filler wire or rod is fed into the weld pool. An inert or semi-inert shielding gas is often released over the weld pool to protect it from oxidation.

GTAW welding, for example, incorporates a tungsten electrode that projects from a ceramic jacket of a hand-held or machine-mounted welding torch. The electrode is placed proximate the desired weld zone of a base metal, while an orifice within the ceramic jacket emits shielding gas such as argon or helium to form the inert shielding atmosphere over the weld zone. An electrical arc is produced between the electrode and the base metal to form the weld pool. The weld pool penetrates the base metal while a metal filler wire is fed into the weld pool, but this is not strictly necessary. Both the base metal and filler wire are melted by the electrical arc, and eventually cool to form a weld joint.

During the construction of flowmeters, a number of parts must be welded together. For flowmeter applications, flanges, conduits, and flow tubes must be welded with precision, meaning that full weld penetration is required, yet excessive penetration is not acceptable. If a weld joint is deemed to have either insufficient or excessive penetration, the weld joint must be ground out and re-welded. In some flowmeter parts, accessing the inner portion, such as the inner diameter of a conduit, after a first weld pass, is impossible. Thus, weld penetration must be correct for the entirety of the weld joint on the first weld pass. This presents a problem, for as many as 90% of welds require at least some form of re-working to meet requirements.

Figure 1:
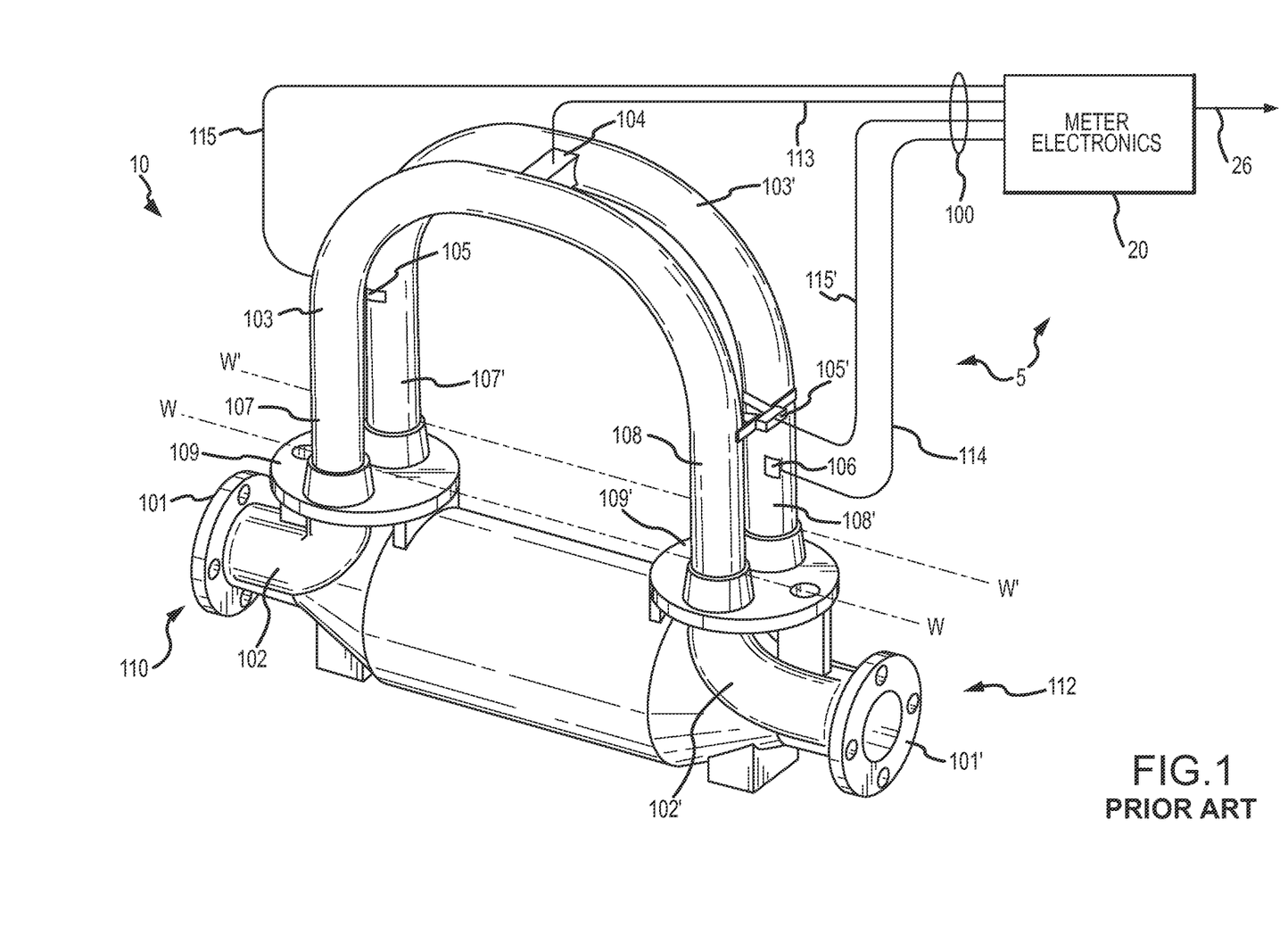
FIG. 1 illustrates a prior art flowmeter.

FIG. 1 is provided as an example of a prior art flowmeter. Conduit sensors, such as Coriolis mass flowmeters and vibrating densitometers, typically operate by detecting motion of a vibrating conduit that contains a flowing material. Properties associated with the material in the conduit, such as mass flow, density and the like, can be determined by processing measurement signals received from motion transducers associated with the conduit. The vibration modes of the vibrating material-filled system generally are affected by the combined mass, stiffness, and damping characteristics of the conduit and the material contained therein.

It is well known to use vibrating flowmeters to measure mass flow and other properties of materials flowing through a pipeline. For example, vibrating Coriolis flowmeters are disclosed in U.S. Pat. No. 4,491,025 issued to J. E. Smith, et al. and also Re. 31,450 to J. E. Smith. These flowmeters have one or more fluid tubes (or "flow tubes"). Each flow tube configuration in a Coriolis mass flowmeter has a set of natural vibration modes, which may be of a simple bending, torsional, radial, lateral, or coupled type. Each flow tube is driven to oscillate at resonance in one of these natural modes. The vibration modes are generally affected by the combined mass, stiffness, and damping characteristics of the flow tube and the material contained therein, thus mass, stiffness, and damping are typically determined during an initial calibration of the flowmeter using well-known techniques.

Material flows into the flowmeter from a connected pipeline on the inlet side of the flowmeter. The material is then directed through the flow tube or flow tubes and exits the flowmeter to a pipeline connected on the outlet side.

A driver, such as a voice-coil style driver, applies a force to the one or more flow tubes. The force causes the one or more flow tubes to oscillate. When there is no material flowing through the flowmeter, all points along a flow tube oscillate with an identical phase. As a material begins to flow through the flow tubes, Coriolis accelerations cause each point along the flow tubes to have a different phase with respect to other points along the flow tubes. The phase on the inlet side of the flow tube lags the driver, while the phase on the outlet side leads the driver. Sensors are typically placed at two different points on the flow tube to produce sinusoidal signals representative of the motion of the flow tube at the two points. A phase difference of the two signals received from the sensors is calculated in units of time.

The phase difference between the two sensor signals is proportional to the mass flow rate of the material flowing through the flow tube or flow tubes. The mass flow rate of the material is determined by multiplying the phase difference by a flow calibration factor. The flow calibration factor is dependent upon material properties and cross-sectional properties of the flow tube. One of the major characteristics of the flow tube that affects the flow calibration factor is the flow tube's stiffness. Prior to installation of the flowmeter into a pipeline, the flow calibration factor is determined by a calibration process. In the calibration process, a fluid is passed through the flow tube at a given flow rate and the proportion between the phase difference and the flow rate is calculated. The flow tube's stiffness and damping characteristics are also determined during the calibration process as is generally known in the art.

One advantage of a Coriolis flowmeter is that the accuracy of the measured mass flow rate is largely not affected by wear of moving components in the flowmeter, as there are no moving components in the vibrating flow tube. The flow rate is determined by multiplying the phase difference between two points on the flow tube and the flow calibration factor. The only input is the sinusoidal signals from the sensors indicating the oscillation of two points on the flow tube. The phase difference is calculated from the sinusoidal signals. Since the flow calibration factor is proportional to the material and cross-sectional properties of the flow tube, the phase difference measurement and the flow calibration factor are not affected by wear of moving components in the flowmeter.

A typical Coriolis mass flowmeter includes one or more transducers (or pickoff sensors, or simply "pickoffs"), which are typically employed in order to measure a vibrational response of the flow conduit or conduits, and are typically located at positions upstream and downstream of the driver. The pickoffs are connected to electronic instrumentation. The instrumentation receives signals from the two pickoffs and processes the signals in order to derive a mass flow rate measurement, among other things.

Typical Coriolis flowmeters measure flow and/or density through the use of a coil and magnet as a pickoff to measure the motion of a meter's vibrating flow tube/tubes. The mass flow rate through the meter is determined from the phase difference between multiple pickoff signals located near the inlet and outlet of the meter's flow tubes. However, it is possible to measure flow using strain gages in place of coil/magnet pickoffs. A fundamental difference between the two sensor types is that coil/magnet pickoffs measure the velocity of the flow tubes and strain gages measure the strain of the flow tubes which is proportional to the tubes' displacement. As such, the placement of each type of sensor will not necessarily be in the same location.

The embodiments described below provide means to weld flanges, conduits, flow tubes, flowmeters, and other non-flowmeter related workpieces. It is an object to provide an embodiment for the welding of workpieces presenting limited access to an inner region thereof. It is an object to provide an embodiment for providing a shielding gas to a workpiece's inner region. It is an object to provide an embodiment for providing a means to control shielding gas pressure within a workpiece's inner region. It is an object to provide an embodiment to introduce a shielding gas to a workpiece's inner region at a pressure that cushions the weld pool so to control the inner weld profile.

SUMMARY OF THE INVENTION

A method for controlling a weld penetration profile on a workpiece having an outer region and an inner region is provided according to an embodiment. According to an embodiment, the steps comprise: applying energy to the outer region of the workpiece with a welder to produce a weld pool; penetrating the workpiece such that the weld pool spans between the outer region and the inner region; and applying a shielding gas to the inner region at a pressure that provides a force that limits weld penetration.

An apparatus for controlling a weld penetration profile on a workpiece having an outer region and an inner region is provided according to an embodiment. According to an embodiment, a welder is configured to create a weld joint from the outer region of the workpiece, wherein the weld joint penetrates from the outer region of the workpiece to the inner region of the workpiece; a gas supply in fluid communication with the inner region is configured to provide a shielding gas to the inner region of the workpiece, wherein a pressure of the shielding gas provides a force that limits weld penetration; and a pressure gauge is in communication with the inner region, wherein the pressure gauge is configured to measure the pressure of the shielding gas present in the inner region.

A method for controlling a weld penetration profile on a portion of a flowmeter having an outer region and an inner region is provided according to an embodiment. According to an embodiment, the steps comprise: applying energy with a welder to the outer region of the portion of the flowmeter to produce a weld pool; penetrating the portion of the flowmeter such that the weld pool spans between the outer region and the inner region; applying a shielding gas to the inner region at a pressure that provides a force that limits weld penetration; maintaining an approximately constant pressure of shielding gas within the inner region, wherein the pressure of shielding gas is between about 0.01 psi and 2.0 psi; measuring the pressure of the shielding gas within the inner region to generate a measured pressure; comparing the measured pressure with a predetermined range of acceptable pressures; and adjusting the pressure of shielding gas within the inner region to be within the acceptable range of pressures if the pressure measured is outside the range of acceptable pressures.

Aspects

According to an aspect, a method for controlling a weld penetration profile on a workpiece having an outer region and an inner region comprises the steps of: applying energy to the outer region of the workpiece with a welder to produce a weld pool; penetrating the workpiece such that the weld pool spans between the outer region and the inner region; and applying a shielding gas to the inner region at a pressure that provides a force that limits weld penetration.

Preferably, the method comprises the step of maintaining an approximately constant pressure of shielding gas within the inner region.

Preferably, the pressure of shielding gas is between about 0.01 psi and 1.0 psi.

Preferably, the pressure of shielding gas is between about 0.03 psi and 0.30 psi.

Preferably, the pressure of shielding gas is between about 0.04 psi and 0.245 psi.

Preferably, the method comprises the steps of: measuring the pressure of the shielding gas within the inner region; comparing a measured pressure with a predetermined range of acceptable pressures; and adjusting the pressure of shielding gas within the inner region to be within the range of acceptable pressures if the pressure measured falls outside the range of acceptable pressures.

Preferably, the method comprises the step of providing a filler metal to the molten pool of metal.

Preferably, the weld is autogenous.

Preferably, the weld penetration is prevented from exceeding approximately 0.0625 inches past a surface defining the inner region.

Preferably, the weld penetration is prevented from exceeding past a surface defining the inner region by a distance that is approximately 10% of the thickness of the workpiece.

According to an aspect, an apparatus for controlling a weld penetration profile on a workpiece having an outer region and an inner region, comprises: a welder configured to create a weld joint from the outer region of the workpiece, wherein the weld joint penetrates from the outer region of the workpiece to the inner region of the workpiece; a gas supply in fluid communication with the inner region configured to provide a shielding gas to the inner region of the workpiece, wherein a pressure of the shielding gas provides a force that limits weld penetration; and a pressure gauge in communication with the inner region, wherein the pressure gauge is configured to measure the pressure of the shielding gas present in the inner region.

Preferably, a valve in fluid communication with the inner region is configured to adjust the shielding gas pressure within the inner region.

Preferably, a system electronics is in communication with both the pressure gauge and the valve, wherein the system electronics is configured to receive a pressure signal from the pressure gauge and adjust the valve accordingly so to maintain the pressure within the inner region within a predetermined pressure range.

Preferably, the predetermined pressure range is between about 0.01 psi and 1.0 psi.

Preferably, the predetermined pressure range is between about 0.03 psi and 0.30 psi.

Preferably, the predetermined pressure range is between about 0.04 psi and 0.245 psi.

Preferably, the welder comprises a gas tungsten arc welding (GTAW) apparatus.

Preferably, the welder comprises a shielded metal arc welding (SMAW) apparatus.

Preferably, the welder comprises a gas metal arc welding (GMAW) apparatus.

Preferably, the welder comprises at least one of a laser beam welder, electroslag welder, magnetic pulse welder, and friction stir welder.

Preferably, the shielding gas comprises argon.

Preferably, the shielding gas comprises at least one of nitrogen, helium, carbon dioxide, oxygen, hydrogen, nitric oxide, sulfur hexafluoride, and dichlorodifluoromethane.

Preferably, the workpiece comprises a steel alloy.

Preferably, the workpiece comprises at least one of steel, stainless steel, aluminum, magnesium, copper, platinum, nickel, carbon, chromium, cobalt, niobium, tungsten, vanadium, zirconium, and molybdenum.

Preferably, the workpiece comprises a conduit.

Preferably, the workpiece comprises a flange.

Preferably, the workpiece comprises at least a part of a flowmeter.

According to an aspect, a method for controlling a weld penetration profile on a portion of a flowmeter having an outer region and an inner region, comprises the steps of: applying energy with a welder to the outer region of the portion of the flowmeter to produce a weld pool; penetrating the portion of the flowmeter such that the weld pool spans between the outer region and the inner region; applying a shielding gas to the inner region at a pressure that provides a force that limits weld penetration; maintaining an approximately constant pressure of shielding gas within the inner region, wherein the pressure of shielding gas is between about 0.01 psi and 2.0 psi; measuring the pressure of the shielding gas within the inner region to generate a measured pressure; comparing the measured pressure with a predetermined range of acceptable pressures; and adjusting the pressure of shielding gas within the inner region to be within the acceptable range of pressures if the pressure measured is outside the range of acceptable pressures.

Preferably, the pressure of the shielding gas is between about 0.03 psi and 0.30 psi.

Preferably, the weld penetration is prevented from exceeding approximately 0.0625 inches past a surface defining the inner region.

Preferably, the weld penetration is prevented from exceeding past a surface defining the inner region by a distance that is approximately 10% of the thickness of the workpiece.

BRIEF DESCRIPTION OF THE DRAWINGS

The same reference number represents the same element on all drawings. The drawings are not necessarily to scale.

DETAILED DESCRIPTION OF THE INVENTION

FIGS. 1-10 and the following description depict specific examples to teach those skilled in the art how to make and use the best mode of embodiments of a method for weld profile control and a related apparatus. For the purpose of teaching inventive principles, some conventional aspects have been simplified or omitted. Those skilled in the art will appreciate variations from these examples that fall within the scope of the invention. Those skilled in the art will appreciate that the features described below can be combined in various ways to form multiple variations of the invention. As a result, the invention is not limited to the specific examples described below, but only by the claims and their equivalents.

FIG. 1 illustrates a prior art flowmeter 5, which can be any vibrating meter, such as a Coriolis flowmeter. The flowmeter 5 comprises a sensor assembly 10 and meter electronics 20. The sensor assembly 10 responds to mass flow rate and density of a process material. Meter electronics 20 are connected to the sensor assembly 10 via leads 100 to provide density, mass flow rate, and temperature information over path 26, as well as other information. Sensor assembly 10 includes flanges 101 and 101', a pair of manifolds 102 and 102', a pair of parallel flow tubes 103 (first flow tube) and 103' (second flow tube), a driver 104, a temperature sensor 106 such as a resistive temperature detector (RTD), and a pair of pickoffs 105 and 105', such as magnet/coil pickoffs, strain gages, optical sensors, or any other pickoff known in the art. The flow tubes 103 and 103' have inlet legs 107 and 107' and outlet legs 108 and 108', respectively. Flow tubes 103 and 103' bend at least one symmetrical location along their length and are essentially parallel throughout their length. Each flow tube 103, 103', oscillate about axes W and W', respectively.

The legs 107, 107', 108, 108' of flow tubes 103,103' are fixedly attached to flow tube mounting blocks 109 and 109' and these blocks, in turn, are fixedly attached to manifolds 102 and 102'. This provides a continuous closed material path through the sensor assembly 10.

When flanges 101 and 101' are connected to a process line (not shown) that carries the process material that is being measured, material enters a first end 110 of the flowmeter 5 through a first orifice (not visible in the view of FIG. 1) in flange 101 and is conducted through the manifold 102 to flow tube mounting block 109. Within the manifold 102, the material is divided and routed through flow tubes 103 and 103'. Upon exiting flow tubes 103 and 103', the process material is recombined in a single stream within manifold 102' and is thereafter routed to exit a second end 112 connected by flange 101' to the process line (not shown).

Flow tubes 103 and 103' are selected and appropriately mounted to the flow tube mounting blocks 109 and 109' so as to have substantially the same mass distribution, moments of inertia, and Young's modulus about bending axes W-W and W'-W', respectively. Inasmuch as the Young's modulus of the flow tubes 103, 103' changes with temperature, and this change affects the calculation of flow and density, a temperature sensor 106 is mounted to a flow tube 103, 103' to continuously measure the temperature of the flow tube. The temperature of the flow tube, and hence the voltage appearing across the temperature sensor 106 for a given current passing therethrough, is governed primarily by the temperature of the material passing through the flow tube. The temperature-dependent voltage appearing across the temperature sensor 106 is used in a well-known method by meter electronics 20 to compensate for the change in elastic modulus of flow tubes 103, 103' due to any changes in flow tube temperature. The temperature sensor is connected to meter electronics 20.

Both flow tubes 103,103' are driven by driver 104 in opposite directions about their respective bending axes W and W' at what is termed the first out-of-phase bending mode of the flowmeter. This driver 104 may comprise any one of many well-known arrangements, such as a magnet mounted to flow tube 103' and an opposing coil mounted to flow tube 103, through which an alternating current is passed for vibrating both flow tubes. A suitable drive signal is applied by meter electronics 20, via lead 113, to the driver 104.

Meter electronics 20 receive the temperature signal on lead 114, and the left and right velocity signals appearing on leads 115 and 115', respectively. Meter electronics 20 produce the drive signal appearing on lead 113 to driver 104 and vibrate flow tubes 103, 103'. Meter electronics 20 processes the left and right velocity signals and the temperature signal to compute the mass flow rate and the density of the material passing through sensor assembly 10. This information, along with other information, is applied by meter electronics 20 over path 26 to utilization means.

A Coriolis flowmeter structure is described although it will be apparent to those skilled in the art that the present invention could be practiced on a vibrating tube densitometer without the additional measurement capability provided by a Coriolis mass flowmeter. In fact, the present invention may be utilized in pipelines, conduits, flanges, of all sizes, with or without means for measuring mass flow, density, etc. The present invention may be practiced in the absence of any flowmeter 5 as well.

Figure 2:
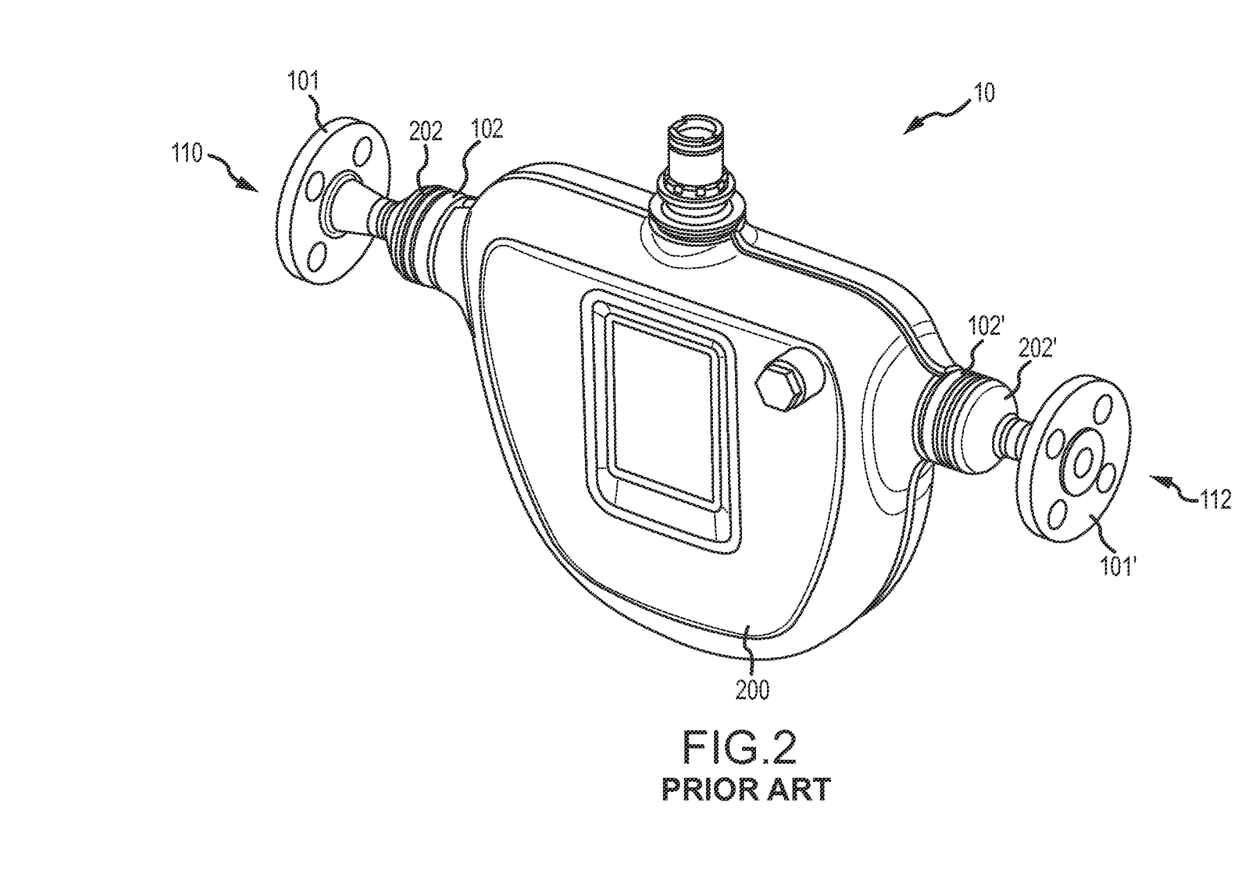
FIG. 2 illustrates another prior art embodiment of a sensor assembly having an outer housing.
Figure 3:
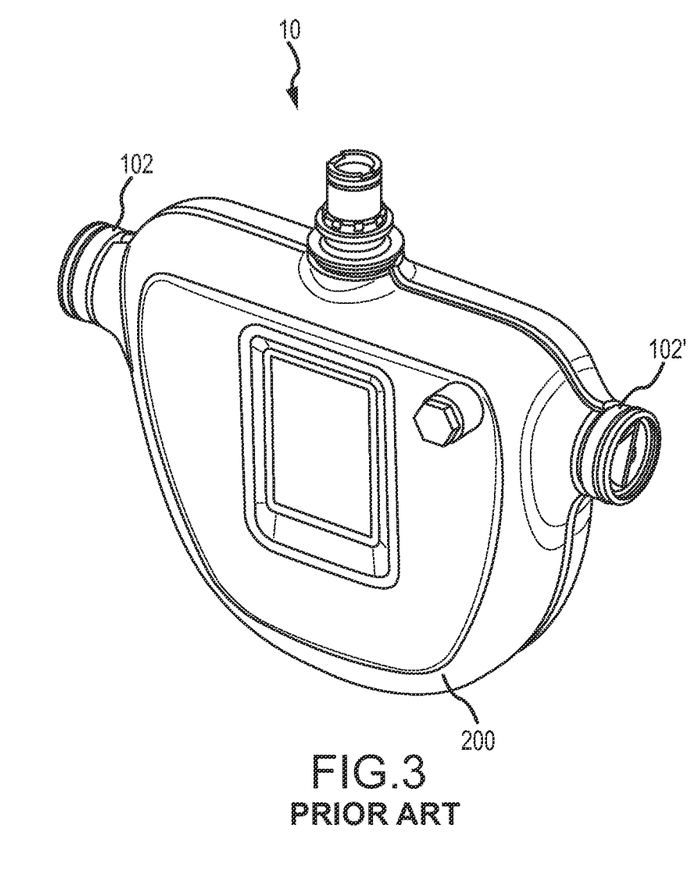
FIG. 3 is a diagram of the prior art embodiment of the sensor assembly of FIG. 2 without adaptors or flanges.

FIG. 2 illustrates another embodiment of a prior art sensor assembly 10 that is encased by a housing 200. Much of the sensor assembly 10 is hidden from view by the housing 200, but the manifolds 102, 102', and flanges 101, 101' are visible. In this embodiment, adapters 202, 202' are welded to connect the flanges 101, 101' to their respective manifolds 102, 102'. FIG. 3 illustrates an embodiment of the prior art sensor assembly 10 of FIG. 2, but with the adapters 202, 202' and flanges 101, 101' absent, for the sake of clarity.

Figure 4:
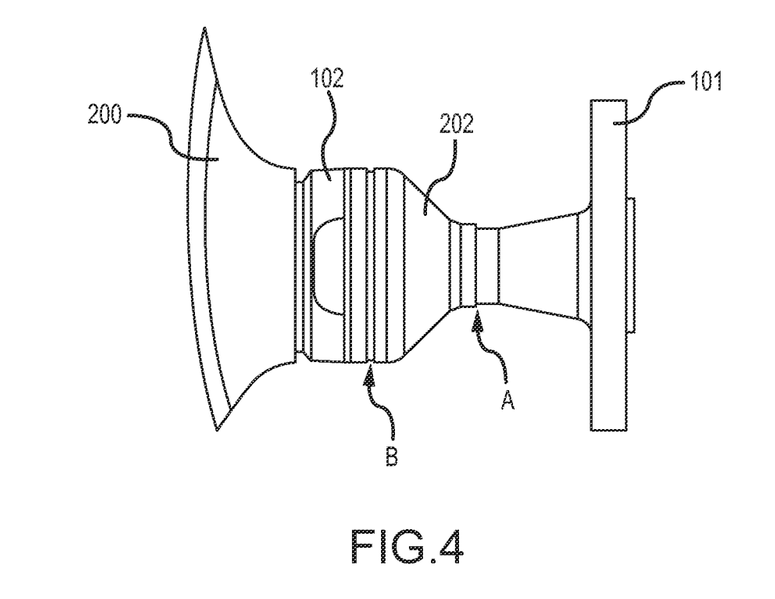
FIG. 4 illustrates a flange and adapter for a flowmeter, indicating weld positions.
Figure 5:
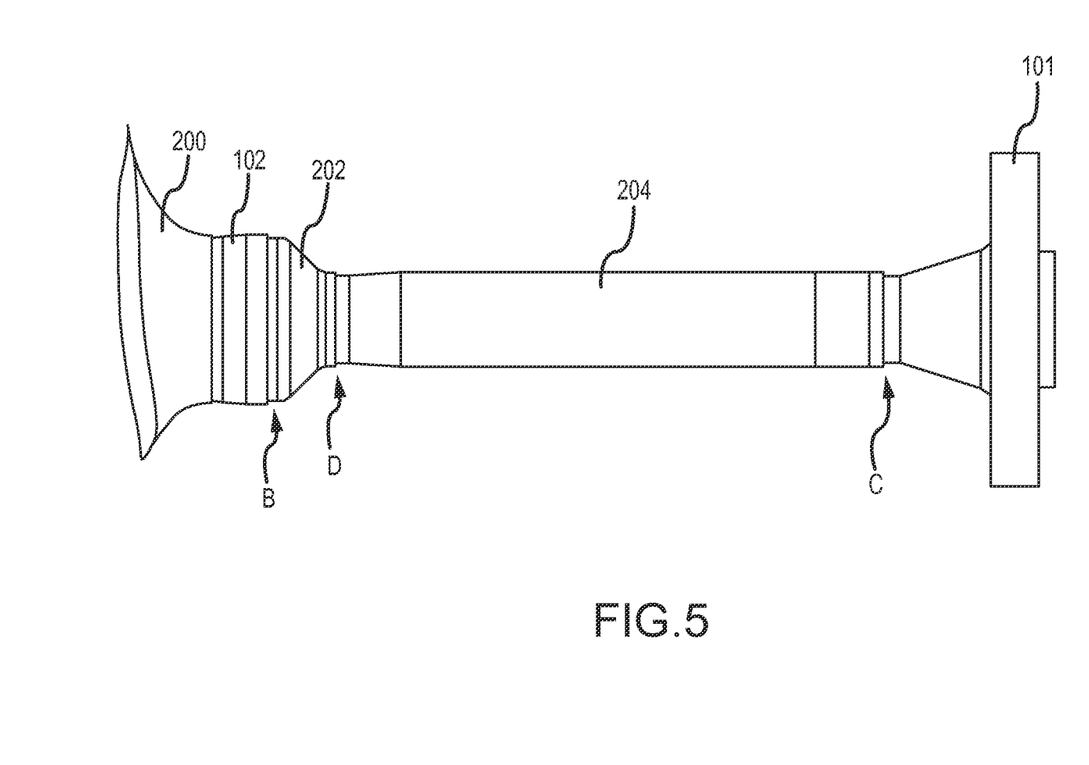
FIG. 5 illustrates a flange, extension conduit, and adapter for a flowmeter, indicating weld positions.

FIGS. 4 and 5 illustrate examples of portions of a sensor assembly 10 that require welding, and where access to an inner surface is limited. FIG. 4 illustrates the adapter 202 and flange 101, as also illustrated in FIG. 2. FIG. 5 illustrates the adapter 202, flange 101 as well as an extension conduit 204 disposed between the adapter 202 and flange 101. The extension conduit 204 affords additional clearance between the flange 101 and the sensor assembly 10. In FIGS. 4 and 5, positions A, B, C and D are illustrated. These are the points where the flange 101 is welded to the adapter 202 (Position A), where the adapter 202 is welded to the manifold 102 (Position B), where the extension conduit 204 is welded to the flange 101 (Position C), and where the extension conduit 204 is welded to the adapter 202 (Position D). These positions are merely examples of portions of a sensor assembly 10 that may be welded, and shall not limit the scope of the claims or specification.

Figure 6:
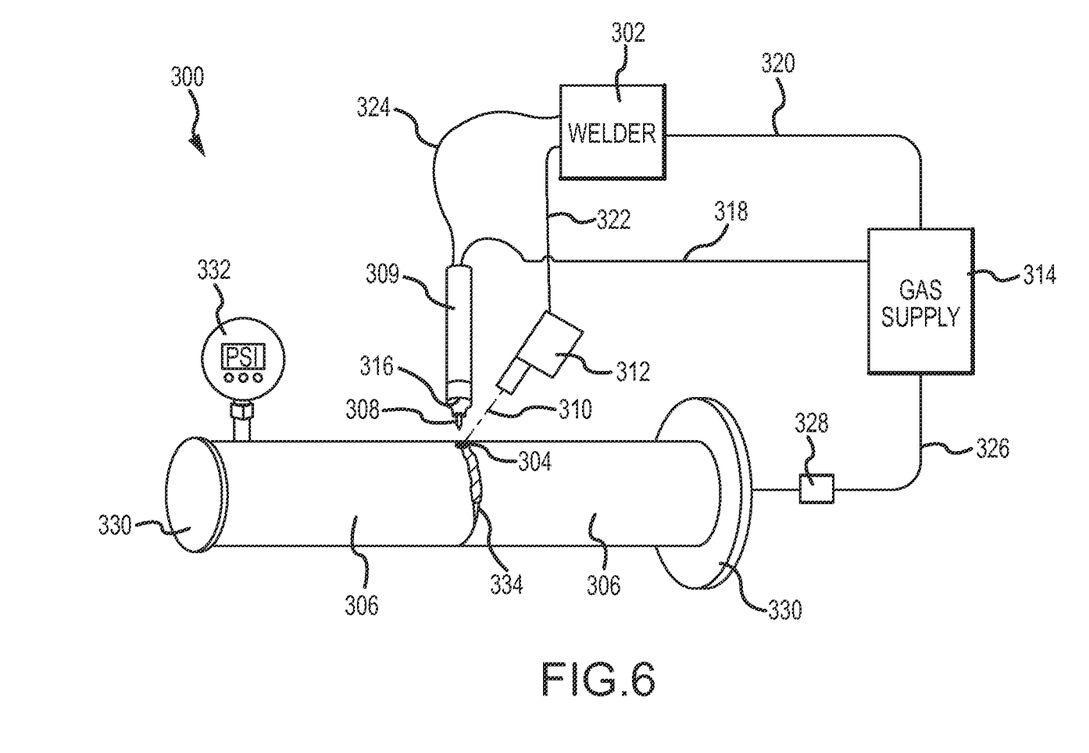
FIG. 6 illustrates an apparatus according to an embodiment.

With initial reference to FIG. 6, an apparatus 300 for controlling weld penetration is provided according to an embodiment. A welding apparatus (welder) 302 is provided as means to provide the necessary energy to form a molten pool of metal (weld pool) 304 on a workpiece 306.

The welder 302 may be any type of welder known in the art capable of a full penetration weld. For example, without limitation, the welder 302 may comprise an electric welding power supply configured to generate an electric arc between an electrode 308 and the base material to melt the workpiece 306 in order to create a weld pool 304 at the point of welding. Electric welding power supplies will either utilize direct (DC) or alternating (AC) current. The power supply may, in other embodiments, utilize gas, laser, electron beam, ultrasonic energy, resistance, magnetism, friction, and any other means to weld known in the art. In FIG. 6, the electrode 308 receives power from the welder 302 via connection 324. The electrode 308 is held by the electrode holder 309.

In the example illustrated by FIG. 6, the electrode 308 is non-consumable, but consumable electrodes are also contemplated. The non-consumable electrode used in GTAW welding, for example, comprises a large portion of tungsten due to its relatively high melting point (3,422° C.). Either electrodes with a clean finish or a ground finish are contemplated. The diameter of the electrode contemplated by the present invention, for GTAW embodiments, may vary between about 0.5 and 7.0 mm. In an embodiment, the diameter is about 3.1 mm. Besides pure tungsten, tungsten alloys comprising cerium oxide, lanthanum oxide, thorium oxide, and/or zirconium oxide are also contemplated.

Metal filler 310 may be introduced to the weld pool 304, though this is not strictly necessary in all instances. The metal filler 310 may be manually added to the weld pool 304, or alternatively may be automatically fed from a filler spool 312 or similar automatic device that is configured to supply a steady feed of metal filler 310. In FIG. 6, the welder 302 is connected to the filler spool 312, and controls the rate of filler deposition via connection 322.

Shielding gas is also contemplated to be introduced to the area surrounding the weld pool 304. The shielding gas protects the welding zone from atmospheric oxygen, for example, which is an oxidizer that promotes fusion defects, porosity, and weld embrittlement. The shielding gas additionally aids in transferring heat from the electrode to the base metal and also promotes a more stable arc in the case of electric welders. In FIG. 6, a gas supply 314 supplies shielding gas through a sleeve 316 that surrounds the electrode 308 via a first gas line 318. The welder 302 meters the gas supply, and controls the shielding gas release via connection 320. In a preferred embodiment, the shielding gas comprises argon. In another embodiment, the shielding gas comprises an argon and carbon dioxide mix (e.g. C-50, C-25, C-15, etc.). In another embodiment, the shielding gas comprises an argon and oxygen mix (e.g. O-5, O-2, O-1, etc.). In another embodiment, the shielding gas comprises an argon and helium mix (e.g. A-75, A-50, A-25, etc.). In another embodiment, the shielding gas comprises an argon and hydrogen mix (e.g. H-35, H-10, H-2, etc.). In another embodiment, the shielding gas comprises argon, carbon dioxide, and helium; or argon, carbon dioxide, and hydrogen; or argon, carbon dioxide, and nitrogen; or argon, carbon dioxide, and oxygen; or argon, helium, and hydrogen; or argon, helium, carbon dioxide, and hydrogen. In another embodiment, the shielding gas comprises at least one of nitric oxide, sulfur hexafluoride, and dichlorodifluoromethane.

In an embodiment, the gas supply 314 provides an inner region 338 (see FIG. 7) of the workpiece 306 with shielding gas via a second gas line 326 in any manner wherein the internal pressure of the inner region may be maintained. It should be noted that the shielding gas supplied to the weld pool 304 by the first gas line 318 and the shielding gas supplied to the inner region 338 of the workpiece 306 by the second gas 326 line may be the same shielding gas or may be different shielding gasses. A valve 328 may provide means to turn on or off the supply of shielding gas to the inner region 338 of the workpiece 306. In the case of an open conduit workpiece 306, a seal may be oriented proximate the conduit ends to form a predominantly sealed inner region that prevents shielding gas from escaping through the conduit ends (though gas will likely escape through the pre-welded abutment of the workpieces). A seal 330 may have the ability to accept the second gas line 326, for example. In an embodiment (not shown), a seal may have a pressure gauge 332 attached thereto. In the embodiment illustrated in FIG. 6, the pressure gauge 332 is attached directly to the workpiece 306. The pressure gauge 332 is configured to measure the pressure of the shielding gas that is introduced into the inner region 338 of the workpiece 306.

When welding, the weld pool 304 may penetrate weld joint 334 partially or fully. If only partial penetration occurs, for a butt joint, this means that the weld pool 304 failed to reach the side of the workpiece 306 opposite the electrode 308. This is generally unacceptable, and would necessitate grinding away the weld joint 334 and re-welding at least a portion thereof. However, if penetration is too great, material will "sag" past a butt joint to a degree that is deemed unacceptable, which differs based on the standards of welding to which one adheres. In a conduit, too much penetration will result in a large bead on the inner diameter of the weld joint 334 that may cause turbulence, weakness, or otherwise affect the integrity of the system in which such a conduit is utilized.

Figure 7:
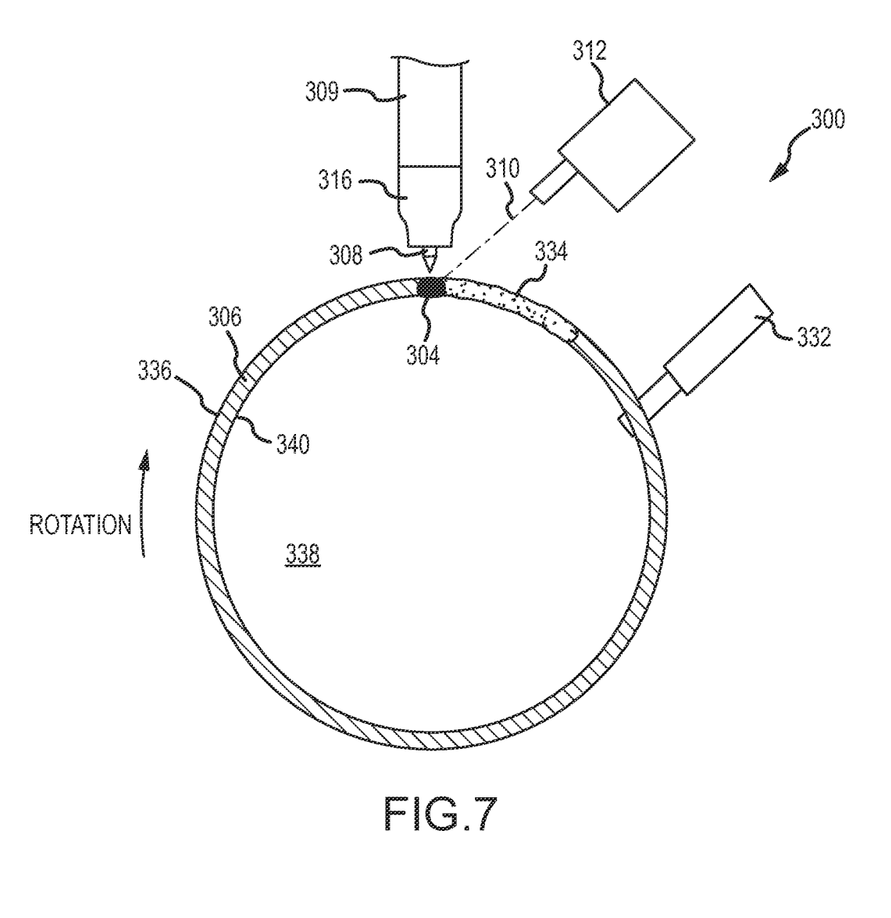
FIG. 7 illustrates a cross-sectional view of the apparatus of FIG. 6.

Turning to FIG. 7, a cross section of a weld joint 334 is illustrated. The apparatus 300, according to an embodiment, controls the weld penetration profile on a workpiece 306 having an outer region 336 and an inner region 338 to prevent excessive penetration past the inner surface 340. In an embodiment, the workpiece 306 is mounted in a lathe that rotates the workpiece so that a circumferential weld may be effectuated with a stationary electrode 308. In this case, as is illustrated in FIG. 7, the workpiece 306 is rotated while the electrode 308 maintains a weld pool 304. This causes the weld joint 334 to deposit on the circumference of the workpiece 306, sealing any gap with molten metal. The weld joint 334 fully penetrates the workpiece 306, so the weld joint 334 thus spans from the outer region 336 to the inner surface 340. A fully penetrating weld extends to and potentially slightly past the inner surface 340 of the inner region 338. Molten metal is relatively fluid, and may drip or sag, thus causing penetration that is greater than what is considered acceptable. In some circumstances, the degree of penetration past the inner surface is limited to 10% of the workpiece thickness. Thus if a workpiece is 3.0 mm in thickness, the acceptable depth of penetration past the inner surface could not be greater than 0.3 mm, for example without limitation. In other cases, the acceptable depth of penetration may be a predetermined distance that is not necessarily defined as a percentage of the workpiece thickness. Thus, $\frac{1}{16}$ of an inch or $\frac{1}{8}$ of an inch could be penetration limits, without regard to the workpiece thickness, for example without limitation.

With continued reference to FIGS. 6 and 7, in an embodiment, shielding gas from a gas supply 314 is introduced into the inner region 338 of the workpiece 306. The pressure gauge 332 measures the pressure of the inner region 338. Since it is desirable that a predetermined pressure of shielding gas in the inner region 338 be maintained, the valve 328 may be adjusted during the course of a weld. As an example, a workpiece 306 may have a relatively large seam that requires welding, so the inner region 338 is filled with shielding gas such that a predetermined pressure is reached. Since shielding gas may escape from the seam, the flow of gas introduced into the inner region 338 is adjusted to maintain pressure despite the escaping gas. However, as the workpiece 306 is welded, and a weld joint 334 is created, the area whereby shielding gas may escape from the inner region 338 is lessened, so the gas pressure has a tendency to increase. Therefore, the valve 328 may be adjusted to decrease the flow of shielding gas into the inner region 338 as the weld joint progresses in order to maintain the desired internal gas pressure. This may be accomplished manually or automatically. By carefully regulating shielding gas pressure in the inner region 338, the weld profile maintains a desired penetration, and is prevented from protruding past any predetermined penetration limits, for the pressure of the shielding gas effectively acts as a cushion, exerting a force on the molten weld pool 304, and reducing sag.

The workpiece 306 may be constructed from any weldable metal. For example, without limitation, the workpiece may comprise: steel, steel alloy, stainless steel, aluminum, magnesium, copper, platinum, nickel, carbon, chromium, cobalt, niobium, tungsten, vanadium, zirconium, molybdenum, or any combination thereof. In an embodiment, the workpiece 306 is made from stainless steel. In another embodiment, the workpiece is made from a Hastelloy®. In yet another embodiment, the workpiece is made from a bimetal.

The pressure of shielding gas in the inner region 338 is varied primarily according the welding process, workpiece material, and workpiece thickness. For example, the pressure of shielding gas in the inner region 338 may be maintained between about 0.05 psi and 2 psi. In another non-limiting example, a stainless steel workpiece 306 undergoing a GTAW welding process may have an internal shielding gas pressure maintained in the inner region 338 at between about 0.1 psi and 0.3 psi. In yet another non-limiting example, a Hastelloy® workpiece 306 undergoing a GTAW welding process may have an internal shielding gas pressure maintained in the inner region 338 at between about 0.03 psi and 0.1 psi. It should be noted that these values assume that the welding position is flat, meaning that the electrode 308 is positioned above the workpiece 306. Other welding positions are contemplated by the present disclosure, and the pressure of shielding gas may be altered to accommodate different welding positions.

Figure 8:
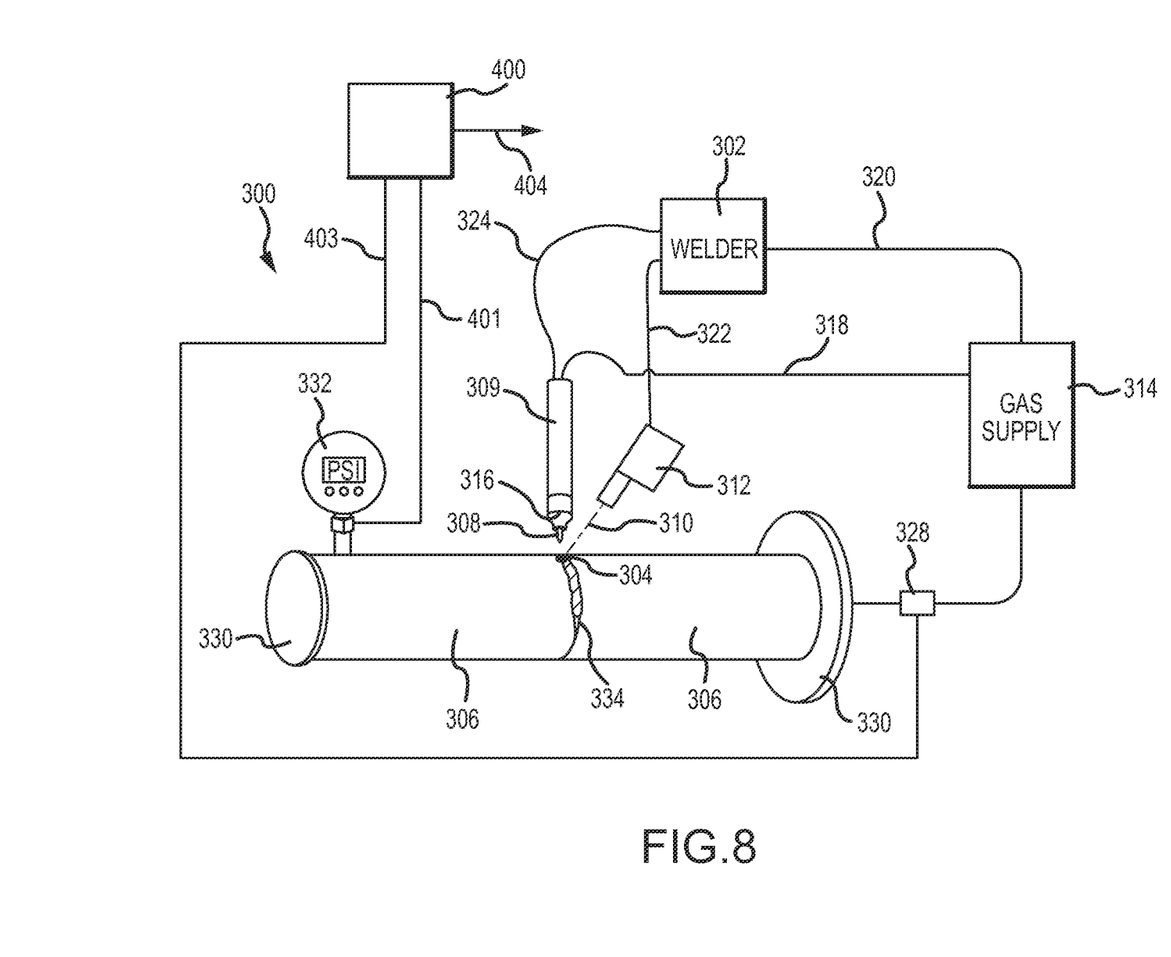
FIG. 8 illustrates another apparatus according to an embodiment.

In the embodiment illustrated in FIG. 8, a system electronics 400 is in communication with the pressure gauge 332 and also with a valve 328. In an embodiment, the valve 328 is automatic, such as a pneumatic, hydraulic, electric, or optical valve. The valve 328 is in fluid communication with the gas supply 314 and also the inner region 338 of the workpiece 306. The valve 328 controls the volume of shielding gas introduced into the inner region 338.

The system electronics 400 may comprise a general purpose computer, a microprocessing system, a logic circuit, or some other general purpose or customized processing device. The system electronics 400 can be distributed among multiple processing devices. The system electronics 400 can include any manner of integral or independent electronic storage medium, such as a computer readable storage system. In one embodiment, the system electronics 400 includes a digitizer, wherein the pressure gauge signal comprises an analog sensor signal. The digitizer samples and digitizes the analog sensor signal and produces a digital sensor signal. The interface/digitizer can also perform any needed decimation, wherein the digital sensor signal is decimated in order to reduce the amount of signal processing needed and to reduce the processing time. The system electronics 400 can perform any necessary or desired signal conditioning, such as any manner of formatting, amplification, buffering, etc.

The system electronics 400 receives a sensor signal on line 401 from the pressure gauge or other pressure sensor. The system electronics 400 processes the sensor signal in order to obtain pressure values of the shielding gas within the inner region 338. The system electronics 400 can send a signal on line 403 to actuate the valve 328. The signal may be electronic, optical, hydraulic, and/or pneumatic. In an embodiment, the valve 328 comprises a solenoid valve capable of metering gas flow. In an embodiment, the valve 328 comprises a needle valve capable of metering gas flow. In an embodiment, the valve 328 comprises a spool valve capable of metering gas flow. The system electronics 400 may read a pressure signal from the pressure gauge 332 and compare this pressure within the workpiece 306 to a predetermined pressure range. If the pressure within the workpiece 306 falls outside the predetermined pressure range, the system electronics 400 sends a signal on line 403 to the valve 328 that either increases or decreases the gas pressure within the workpiece so that the pressure changes to a predetermined pressure or to fall within a predetermined pressure range.

The system electronics 400 can include a communications path 404. The communications path 404 can enable communications between the system electronics 400, the welder 302, and external devices. The communications path can be capable of any manner of electronic, optical, or wireless communication.

Figure 9:
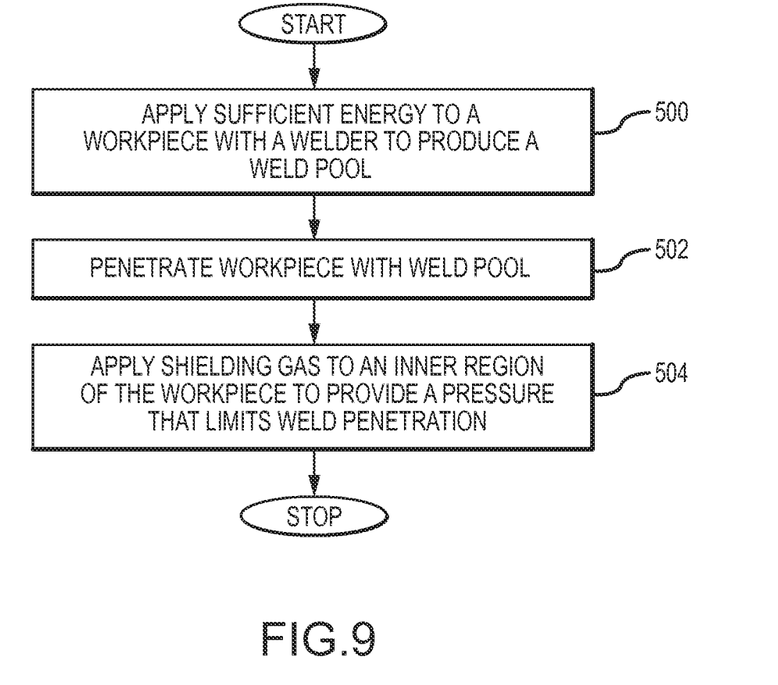
FIG. 9 illustrates a flow chart describing a method of an embodiment.

Turning now to FIG. 9, an embodiment comprises a method for controlling a weld penetration profile on a workpiece 306 having an outer region 336 and an inner region 338, wherein the workpiece 306 is made of a base metal. In step 500, energy is provided to the outer region 336 of the workpiece 306 with a welder 302 to produce a molten pool of metal (weld pool) 304 by melting at least the base metal. The energy is either electrical, laser, ultrasonic, from a gas flame, friction, or any other welding energy source known in the art. In one embodiment, the welder 302 comprises a gas tungsten arc welding (GTAW) apparatus. In another embodiment, the welder 302 comprises a shielded metal arc welding (SMAW) apparatus. In yet another embodiment, the welder 302 comprises a gas metal arc welding (GMAW) apparatus. Any other welder 302 type known in the art is also contemplated, as will be readily apparent by one skilled in the art. In step 502, the workpiece 306 is fully penetrated such that the weld pool 304 spans between the outer region 336 and inner region 338. This is considered a full penetration weld. A shielding gas is provided to the inner region 338 at a pressure that provides a cushioning force that limits weld penetration in step 504.

Figure 10:
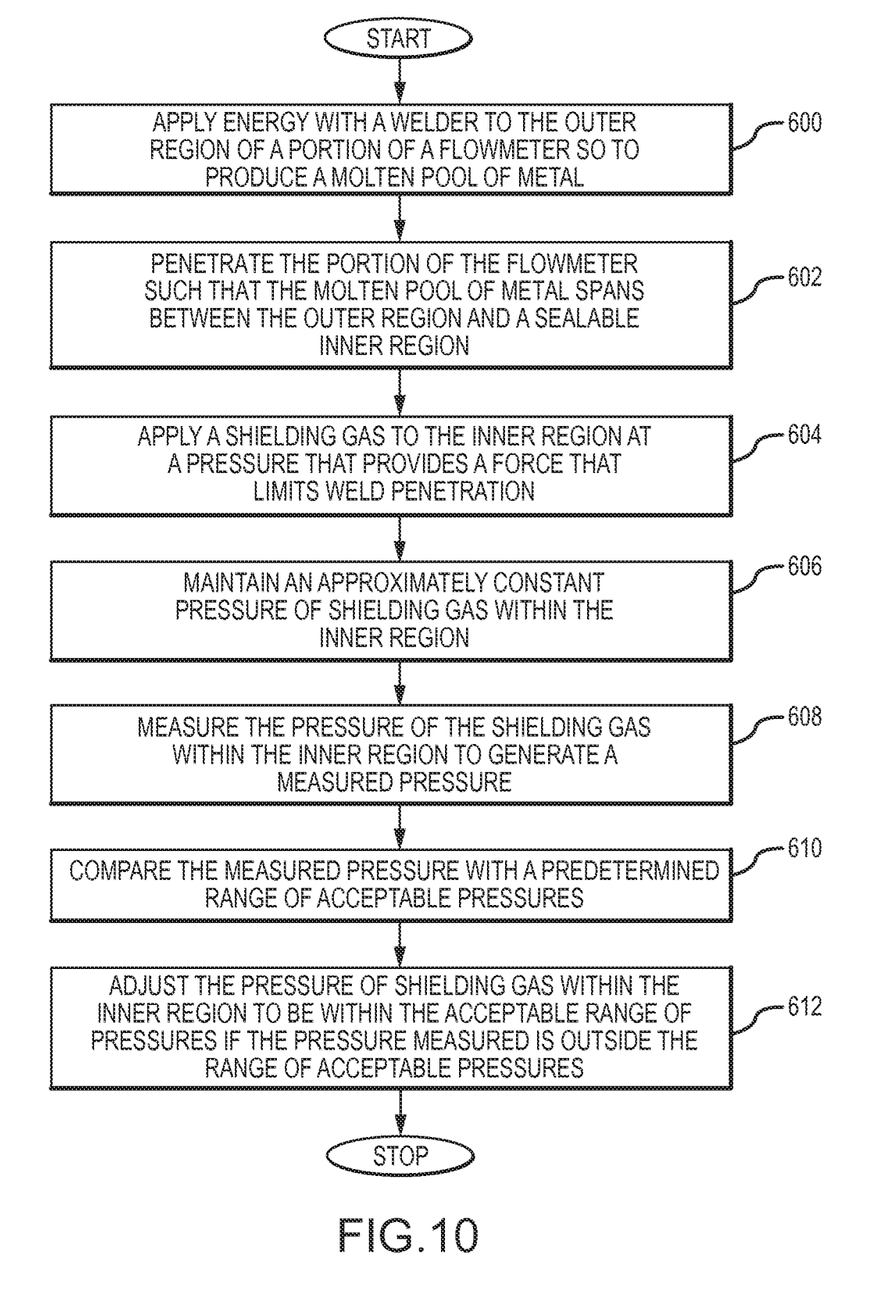
FIG. 10 illustrates a flow chart describing another method of an embodiment.

A related embodiment, shown in FIG. 10, comprises a method for controlling a weld penetration profile on a workpiece having an outer region and an inner region, wherein the workpiece is made of a base metal. In step 600, energy is provided to the outer region 336 of the workpiece 306 with a welder 302 to produce a molten pool of metal (weld pool) 304 by melting at least the base metal. In step 602, the workpiece 306 is fully penetrated such that the weld pool 304 spans between the outer region 336 and inner region 338. A shielding gas is provided to the inner region 338 at a pressure that provides a force that limits weld penetration in step 604. Once the desired pressure is reached in step 604, an approximately constant pressure of shielding gas is maintained within the inner region, as shown in step 606. In an embodiment, the pressure of shielding gas is between about 0.01 psi and 1.0 psi. In another embodiment, the pressure of shielding gas is between about 0.03 psi and 0.30 psi. In yet another embodiment, the pressure of shielding gas is between about 0.04 psi and 0.245 psi. In step 608, the pressure of the shielding gas within the inner region is measured. This measured pressure value is then compared with a predetermined range of acceptable pressures in step 610. This aids in the verification that the gas pressure is in an acceptable range. In step 612, the pressure of the shielding gas within the inner region is adjusted to be within the acceptable range of pressures if the pressure measured is outside the range of acceptable pressures. By providing an appropriate pressure for the particular type of metal, type of welder, and base metal dimensions, the weld penetration may be prevented from exceeding approximately 0.0625 inches past a surface defining the inner region of the inner region. In another embodiment, the weld penetration is prevented from exceeding past a surface defining the inner region by a distance that is approximately 10% of the thickness of the workpiece.

The methods for controlling a weld penetration profile may comprise providing a filler metal to the molten pool of metal. However, the weld may alternatively be autogenous. In an embodiment, multiple weld passes are made on a single joint, and each pass may be either autogenous or use a filler metal.

The detailed descriptions of the above embodiments are not exhaustive descriptions of all embodiments contemplated by the inventors to be within the scope of the invention. Indeed, persons skilled in the art will recognize that certain elements of the above-described embodiments may variously be combined or eliminated to create further embodiments, and such further embodiments fall within the scope and teachings of the invention. It will also be apparent to those of ordinary skill in the art that the above-described embodiments may be combined in whole or in part to create additional embodiments within the scope and teachings of the invention.

Thus, although specific embodiments of, and examples for, the invention are described herein for illustrative purposes, various equivalent modifications are possible within the scope of the invention, as those skilled in the relevant art will recognize. The teachings provided herein can be applied to other devices and methods, and not just to the embodiments described above and shown in the accompanying figures. Accordingly, the scope of the invention should be determined from the following claims.

What is claimed is:

1. A method for controlling a weld penetration profile on a workpiece having an outer region and an inner region comprising the steps of:
   placing seals oriented proximate open conduit ends of the workpiece to form a predominantly sealed inner region that prevents shielding gas from escaping through the conduit ends, wherein gas may only escape a pre-welded abutment of the workpiece;

applying energy to the outer region of the workpiece with a welder to produce a weld pool;

penetrating the workpiece such that the weld pool spans between the outer region and the inner region; and applying a shielding gas to the inner region at a pressure that provides a force that limits weld penetration;

measuring the pressure of the shielding gas within the inner region;

comparing a measured pressure with a predetermined range of acceptable pressures; and adjusting the pressure of shielding gas within the inner region (338) to be within the range of acceptable pressures if the pressure measured falls outside the range of acceptable pressures to maintain a constant pressure of shielding gas within the inner region.

2. The method for controlling a weld penetration profile of claim 1, wherein the pressure of shielding gas is between about 0.01 psi and 1.0 psi.

3. The method for controlling a weld penetration profile of claim 1, wherein the pressure of shielding gas is between about 0.03 psi and 0.30 psi.

4. The method for controlling a weld penetration profile of claim 1, wherein the pressure of shielding gas is between about 0.04 psi and 0.245 psi.

5. The method for controlling a weld penetration profile of claim 1, comprising the step of:
providing a filler metal to the weld pool of metal.

6. The method for controlling a weld penetration profile of claim 1, wherein the weld is autogenous.

7. The method for controlling a weld penetration profile of claim 1, wherein the weld penetration is prevented from exceeding approximately 0.0625 inches past a surface defining the inner region.

8. The method for controlling a weld penetration profile of claim 1, wherein the weld penetration is prevented from exceeding past a surface defining the inner region by a distance that is approximately 10% of the thickness of the workpiece.

9. An apparatus (300) for controlling a weld penetration profile on a workpiece (306) having an outer region (336) and an inner region (338), comprising:
a welder (302) configured to create a weld joint (334) from the outer region (336) of the workpiece (306), wherein the weld joint (334) penetrates from the outer region (336) of the workpiece (306) to the inner region (338) of the workpiece (306);
seals oriented proximate open conduit ends of the workpiece to form a predominantly sealed inner region that prevents shielding gas from escaping through the conduit ends, wherein gas may only escape a pre-welded abutment of the workpiece;
a gas supply (314) in fluid communication with the inner region (338) configured to provide a shielding gas to the inner region (338) of the workpiece (306), wherein a pressure of the shielding gas provides a force that limits weld penetration; and
a pressure gauge (332) in communication with the inner region (338), wherein the pressure gauge (332) is configured to measure the pressure of the shielding gas present in the inner region (338);
a valve (328) in fluid communication with the inner region (338) configured to adjust the shielding gas pressure within the inner region (338) by controlling the amount of shield gas provided by the gas supply (314);
a system electronics (400) in communication with both the pressure gauge (332) and the valve (328), wherein the system electronics (400) is configured to receive a pressure signal from the pressure gauge (332) and adjust the valve (328) accordingly so to maintain a constant pressure within the inner region (338).

10. The apparatus (300) for controlling a weld penetration of claim 9, wherein the predetermined pressure range is between about 0.01 psi and 1.0 psi.

11. The apparatus (300) for controlling a weld penetration of claim 9, wherein the predetermined pressure range is between about 0.03 psi and 0.30 psi.

12. The apparatus (300) for controlling a weld penetration of claim 9, wherein the predetermined pressure range is between about 0.04 psi and 0.245 psi.

13. The apparatus (300) for controlling a weld penetration of claim 9, wherein the welder (302) comprises a gas tungsten arc welding (GTAW) apparatus.

14. The apparatus (300) for controlling a weld penetration of claim 9, wherein the welder (302) comprises a shielded metal arc welding (SMAW) apparatus.

15. The apparatus (300) for controlling a weld penetration of claim 9, wherein the welder (302) comprises a gas metal arc welding (GMAW) apparatus.

16. The apparatus (300) for controlling a weld penetration of claim 9, wherein the welder (302) comprises at least one of a laser beam welder, electroslag welder, magnetic pulse welder, and friction stir welder.

17. The apparatus (300) for controlling a weld penetration of claim 9, wherein the shielding gas comprises argon.

18. The apparatus (300) for controlling a weld penetration of claim 9, wherein the shielding gas comprises at least one of nitrogen, helium, carbon dioxide, oxygen, hydrogen, nitric oxide, sulfur hexafluoride, and dichlorodifluoromethane.

19. The apparatus (300) for controlling a weld penetration of claim 9, wherein the workpiece (306) comprises a steel alloy.

20. The apparatus (300) for controlling a weld penetration of claim 9, wherein the workpiece (306) comprises at least one of steel, stainless steel, aluminum, magnesium, copper, platinum, nickel, carbon, chromium, cobalt, niobium, tungsten, vanadium, zirconium, and molybdenum.

21. The apparatus (300) for controlling a weld penetration of claim 9, wherein the workpiece (306) comprises a conduit.

22. The apparatus (300) for controlling a weld penetration of claim 9, wherein the workpiece (306) comprises a flange.

23. The apparatus (300) for controlling a weld penetration of claim 9, wherein the workpiece (306) comprises at least a part of a flowmeter (5).

24. A method for controlling a weld penetration profile on a portion of a flowmeter having an outer region and an inner region, comprising the steps of:
placing seals oriented proximate open conduit ends of the workpiece to form a predominantly sealed inner region that prevents shielding gas from escaping through the conduit ends, wherein gas may only escape a pre-welded abutment of the workpiece;
applying energy with a welder to the outer region of the portion of the flowmeter to produce a weld pool;
penetrating the portion of the flowmeter such that the weld pool spans between the outer region and the inner region;
applying a shielding gas to the inner region at a pressure that provides a force that limits weld penetration;

maintaining an approximately constant pressure of shielding gas within the inner region, wherein the pressure of shielding gas is between about 0.01 psi and 2.0 psi;

measuring the pressure of the shielding gas within the inner region to generate a measured pressure;

comparing the measured pressure with a predetermined range of acceptable pressures; and adjusting the pressure of shielding gas within the inner region to be constant.

25. The method for controlling a weld penetration profile on a portion of a flowmeter of claim 24, wherein the pressure of the shielding gas is between about 0.03 psi and 0.30 psi.

26. The method for controlling a weld penetration profile on a portion of a flowmeter of claim 24, wherein the weld penetration is prevented from exceeding approximately 0.0625 inches past a surface defining the inner region.

27. The method for controlling a weld penetration profile on a portion of a flowmeter of claim 24, wherein the weld penetration is prevented from exceeding past a surface defining the inner region by a distance that is approximately 10% of the thickness of the workpiece.

* * * * *